Figure 2:
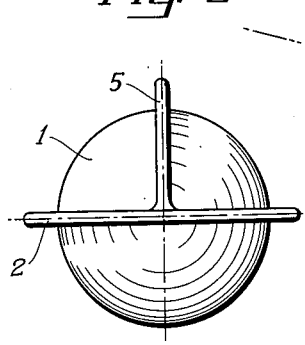

May 8, 1962 S. W. BENGTSSON 3,032,912
DEVICES FOR FISH-TACKLES
Filed July 3, 1958

INVENTOR
SIGURD WALTER BENGTSSON
By Linton and Linton
ATTORNEYS

United States Patent Office 3,032,912
Patented May 8, 1962

3,032,912
DEVICES FOR FISH-TACKLES
Sigurd Walter Bengtsson, Rattgatan 6, Goteborg, Sweden
Filed July 3, 1958, Ser. No. 746,434
Claims priority, application Sweden July 20, 1957
7 Claims. (Cl. 43—43.13)

This invention relates to improvements in devices to be used as sinkers or as floats for such fish-tackles as in the fishing are dragged through the fishing waters.

It is known to use hollow balls as floats for trawls, said balls being connected to the mouth of the trawl and by their lifting capacity holding said mouth open. These balls which generally are of glass are attached to the mouth of the trawl by means of a bag enclosing the ball and made from a network of lines. This device has certain drawbacks, for example it offers great resistance to the drag of the trawl in the water. In order to avoid these drawbacks so called paravanes having cutting-planes have been used, the body of the paravane being given a more or less complicated form in order to increase or diminish the lifting power thereof in correspondence with the velocity of the dragging. In order to decrease the water resistance it has been proposed to use floats having a streamline shape in combination with a rudder or cutting-plane arrangement. In practice, however, all these devices have been more or less unsatisfactory. It would appear to be correct to give the float a streamline or drop shape, but in combination with a cutting-plane arrangement this shape is of no use, because an intention of the cutting-plane arrangement is that the longitudinal axis of the drop-shaped float shall be able to occupy different inclinations in relation to the direction of the traction according to the point of engagement of the dragging line in the paravane and other factors, and the condition for an advantage of the streamline shape thus will be eliminated.

The present invention relates in particular to a device for a fish-tackle to be dragged in the water of the kind comprising a body which, according to its buoyancy, is adapted to operate as a sinker or as a float for a part of the fish-tackle and which is fixedly connected with a cutting-plane arrangement comprising at least a fin serving as a horizontal rudder and a fin serving as a vertical rudder.

The principal object of the invention is to create a device of said kind offering little resistance when dragged through the water.

Another object of the invention is to create a device of said kind which will facilitate the fishing and make the same more interesting particularly for amateur fishermen.

A further object of the invention is to create a device of said kind having a relatively simple shape and which may be easily and cheaply manufactured.

Other objects of the invention will be made clear by the following description.

According to the present invention, the body connected with said cutting-plane arrangement has substantially the shape of a ball to which the horizontal and vertical fins of the cutting-plane arrangement are connected in such a manner that their planes are substantially disposed in correspondence with great circle planes of the ball. It has been found that the ball-shaped sinker or float in combination with said cutting-plane arrangement offers an essentially smaller water resistance than a corresponding device with a sinker or float of a streamline shape. The horizontal as well as the vertical fins extend a short distance before the great circle plane perpendicular to said fins, said distance being only a fractional part of the length of the radius of the ball the major portion of the fins being located rearwardly of the ball. Furthermore it has been noted that a better result is obtained when the longitudinal outer-edges of the fins are parallel than if they converge or diverge rearwardly.

Figure 1:
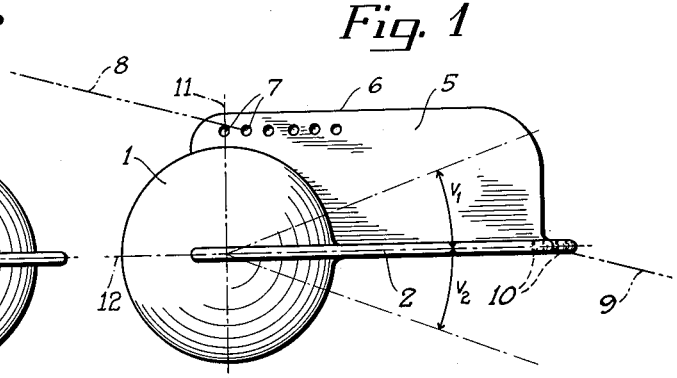
Figure 3:
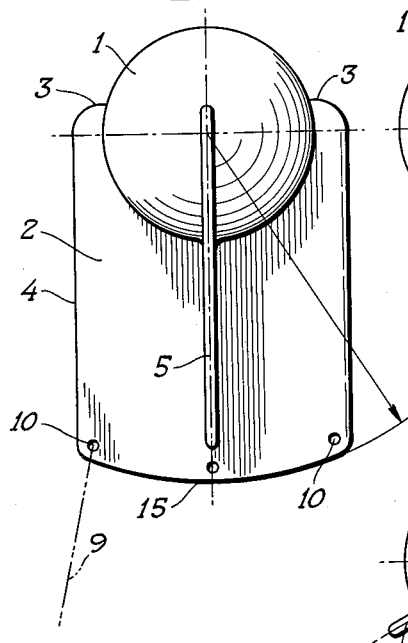
Figure 4:
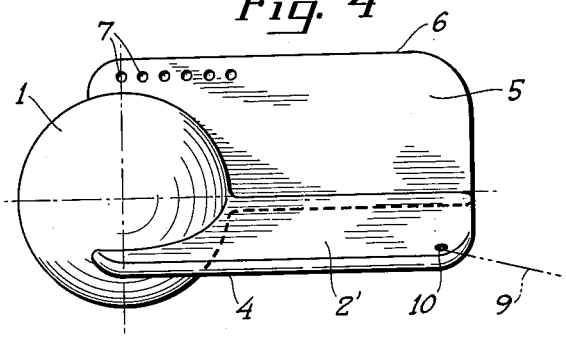
Figure 5:
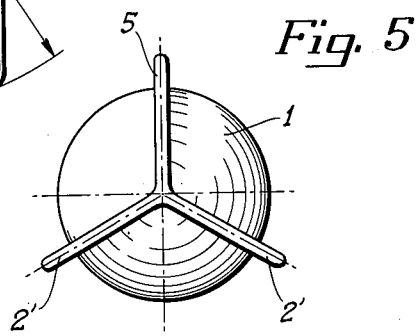

The invention will be made more clear by the following description with reference to the accompanying drawing showing two embodiments of the invention. In the drawing FIG. 1 is a side-view of one preferred form of the device, FIG. 2 is an end view and FIG. 3 is a plan-view of this form. FIGS. 4 and 5 are views of the second embodiment and correspond to FIGS. 1 and 2 respectively.

In the drawing, 1 denotes a ball-shaped (spherical) body having a smooth surface and preferably being solid and made from suitable material such as light-metal when the device is intended to be used as a sinker and hollow or made from material with lower specific gravity than water when the device is intended to be used as a float. According to the form of FIGURES 1–3 a plane disc 2 serving as a horizontal fin or rudder is attached to this ball in a great circle plane of the ball in such a manner that the fore edges 3 of the disc disposed on opposite sides of the ball are located a short distance in front of the great circle plane 11 of the ball perpendicular to the horizontal and vertical fins or rudder discs 2 and 5. The longitudinal edges 4 of the horizontal fin are substantially parallel. The rear edge 15 of the fin 2 forms a convex arc of a circle the centre of which coincides with that of the ball. The total length of the fin 2 from the edges 3 should preferably be about three to five times the radius of the ball and the total width, i.e. the distance between the edges 4, is preferably about two ball radii and a half to three ball radii and a half. The corners of the fins are rounded off. The vertical fin 5, which also is disposed in a great circle plane of the ball 1 may extend rearwardly to slightly shorter length than the horizontal fin 2 so that a space also for a middle hole 10 is provided at the rear edge 15 of the fin 2. The longitudinal inner edge of the fin 5 is connected to the fin 2 at the longitudinal centre line of the latter. The opposite outer edge 6 of the fin 5 extends substantially parallel with the longitudinal outer edges 4 of the fin 2, and its width is substantially half the width of the horizontal fin. Along the longitudinal edge 6 and parallel with this edge, the fin 5 is provided with a series of holes 7 the foremost one of which is substantially located in the great circle plane 11.

If the device is to be used for example as a sinker for a whiffing-line for a hook with a bait dragged in the water by a vessel, in which case the ball 1 and the entire device should have greater weight than the corresponding volume of water, the drag-line 8 from the vessel is connected to one of the holes 7 according to the depth desired for the hook. The snell 9 for the hook is connected to one of the holes 10 at the rear edge 15 of the fin 2. By dragging in the line 8 the fin 2 will occupy an inclining angle $v_1$ in relation to the horizontal plane 12 through the centre of the ball 1, the size of this angle depending on the velocity of the vessel, the operative length and character of the line 8, the position of the hole 7 to which the drag-line is attached and also to the resistance in the water of the snell 9 with hook and bait (not shown). Said angle $v_1$ may, for instance, be about 20°. When an obliquely downward dragging in the snell arises due to a bite of a fish, the fin 2 immediately changes its inclining position to an angle $v_2$ so that the rear edge 15 sinks whereby the device is steered up towards the surface dragging the fish on the hook so that the fish often will be visible at the surface of the water very soon. By the arrangement of connection holes 10 at the corners of the rudder disc 2, the vertical fin 5, when the snell is connected to one of these holes, will adjust itself angularly to the drag direction and steer the device laterally. By this arrangement of the holes 10 it will be possible to drag two fishing lines 9, each provided with a device according to the present invention from the same point of a boat or vessel without the lines getting entangled.

When the device is used as a sinker the side of the horizontal fin 2 to which the vertical fin 5 is attached is turned up. When the device is used as a float for the mouth of a trawl and the device has to create a suitable lifting power, said side of the horizontal fin 2 is turned down and the device is by means of one of the holes 7 and a line connected to the trawl. Also in this case the lifting power of the device can be accommodated by choice of suitable hole 7 for connection of this line.

The embodiment of FIGURES 4 and 5 differs from the embodiment above described only by the fact that the horizontal rudder or fin is formed by two disc parts 2' which are connected to the longitudinal inner edge of the vertical fin 5 forming with the latter an angle exceeding 90 degrees but preferably not exceeding about 120 degrees.

The fins according to both embodiments may be moulded in one piece with the ball.

What I claim is:

1. A paravane device for fishing tackles to be dragged through the water, comprising a body which is spherical in its entirety, a vertical fin fixedly connected to said body and being substantially located in a great circle plane of said body laterally of a straight line through the center of said spherical body for serving as a vertical rudder for the paravane device, there being means provided at the upper edge of said fin for connection to the fishing tackle, a second fin fixedly connected to said body and to said vertical fin along said straight line, said second fin extending from both opposite sides of said vertical fin in angular and symmetrical relation to said vertical fin, said second fin adapted to act as a bearing surface and horizontal rudder in the movement of the paravane device in the water, a minor portion of said fins extending a distance forward of a great circle plane of said body perpendicular to said fins, and a major portion of said fins being located rearwardly of said body.

2. A paravane device for fishing tackles to be dragged through the water, comprising a body which is spherical in its entirety, a vertical fin fixedly connected to said body and substantially located in a great circle plane of said body laterally of a straight line through the center of said spherical body for serving as a vertical rudder for the paravane device, said vertical fin having openings in the upper edge thereof for being connected to the fishing tackle, a second fin fixedly connected to said body and to said vertical fin along said straight line, said second fin extending from both opposite sides of said vertical fin in angular and symmetrical relation to said vertical fin, said second fin adapted to act as a bearing surface and horizontal rudder in the movement of the paravane device in the water, a minor portion of said fins extending a distance forward of a great circle plane of said body perpendicular to said fins with said distance being only a fractional part of the radius of said body, and the major portion of said fins being located rearwardly of said body.

3. A paravane device for fishing tackles as claimed in claim 1 wherein the longitudinal outer edges of said vertical rudder fin and said second rudder fin are substantially parallel with said straight line through the center of said spherical body.

4. A paravane device for fishing tackles as claimed in claim 1 wherein the total length of said fins is approximately three to five times the radius of said spherical body.

5. A paravane device for fishing tackles as claimed in claim 1, wherein said connecting means on said vertical fin for the fishing tackle comprises a series of holes along the longitudinal upper edge of said fin, the foremost of these holes being located substantially in a great circle plane of said body perpendicular to said fins.

6. A paravane device for fishing tackles to be dragged through the water, comprising a body which is spherical in its entirety, a vertical fin fixedly connected to said body and substantially located in a great circle plane of said body laterally of a straight line through the center of said spherical body for serving as a vertical rudder for the paravane device, means provided along the free edge of said vertical fin capable of being connected to the fishing tackle, a second fin fixedly connected to said body and to said vertical fin along said straight line, said second fin substantially located in a second great circle plane of said body perpendicular to the first-mentioned great circle plane and adapted to serve as a bearing surface and horizontal rudder of the paravane, the lower edge of said vertical fin being connected to the upwardly facing side of said second fin along said straight line in symmetrical relation to said vertical fin, a minor portion of said fins extending a distance forward of a third great circle plane of said body perpendicular to the two great circle plane before mentioned, and the major portion of said fins being located rearwardly of said third plane.

7. A paravane device for fishing tackles to be dragged through the water, comprising a body which is substantially spherical in its entirety, a vertical fin fixedly connected to said body and substantially located in a great circle plane of said body laterally of a straight line through the center of said spherical body for serving as a vertical rudder for the paravane device, means provided along the free edge of said vertical fin capable of being connected to the fishing tackle, a pair of disc parts fixedly connected to said body in each of two other great circle planes of said body symmetrically to said vertical fin and adapted together to act as a bearing surface and horizontal rudder, each of said disc parts forming an angle with said vertical fin between 90° and 120°, said vertical rudder fin and said disc parts being united along said straight line, a minor portion of said vertical rudder fin and disc parts being positioned forward of a fourth great circle plane perpendicular to all of the first-mentioned great circle planes, a minor portion of the vertical and horizontal rudders being positioned forwardly of said fourth great circle plane, and a major portion of said rudders extending rearwardly of said body.

References Cited in the file of this patent

UNITED STATES PATENTS

| D. 166,984 | Lawrence | June 10, 1952 |
| 1,701,444 | Darr | Feb. 5, 1929 |
| 2,049,789 | Webster | Aug. 4, 1936 |
| 2,605,576 | Young | Aug. 5, 1952 |
| 2,801,491 | Lawrence | Aug. 6, 1957 |
| 2,826,851 | Borgogno | Mar. 18, 1958 |

FOREIGN PATENTS

| 499,436 | Belgium | Dec. 15, 1950 |
| 1,150,333 | France | Aug. 5, 1957 |
| 362,324 | Great Britain | Dec. 3, 1931 |
| 537,726 | Great Britain | July 3, 1941 |
| 783,946 | Great Britain | Oct. 2, 1957 |
| 155,570 | Sweden | Aug. 6, 1956 |